US012580259B2

(12) United States Patent
Tada et al.

(10) Patent No.: US 12,580,259 B2
(45) Date of Patent: Mar. 17, 2026

(54) BATTERY PACK

(71) Applicant: SANYO Electric Co., Ltd., Osaka (JP)

(72) Inventors: Manabu Tada, Hyogo (JP); Takeshi Hashimoto, Nara (JP); Ryusuke Tsujiguchi, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 702 days.

(21) Appl. No.: 17/439,468

(22) PCT Filed: Mar. 19, 2020

(86) PCT No.: PCT/JP2020/012309
§ 371 (c)(1),
(2) Date: Sep. 15, 2021

(87) PCT Pub. No.: WO2020/196267
PCT Pub. Date: Oct. 1, 2020

(65) Prior Publication Data
US 2022/0158297 A1 May 19, 2022

(30) Foreign Application Priority Data
Mar. 27, 2019 (JP) ................................. 2019-060103

(51) Int. Cl.
H01M 50/213 (2021.01)
H01M 50/227 (2021.01)
(Continued)

(52) U.S. Cl.
CPC ....... H01M 50/213 (2021.01); H01M 50/227 (2021.01); H01M 50/231 (2021.01);
(Continued)

(58) Field of Classification Search
CPC ............ H01M 50/394; H01M 50/231; H01M 50/278; H01M 50/227; H01M 50/276;
(Continued)

(56) References Cited

U.S. PATENT DOCUMENTS

| | | | |
|---|---|---|---|
| 6,225,778 B1 * | 5/2001 | Hayama | ............... H01M 50/55 |
| | | | 320/112 |
| 6,783,486 B1 | 8/2004 | Murakami | |

(Continued)

FOREIGN PATENT DOCUMENTS

| | | |
|---|---|---|
| CN | 105531846 A | 4/2016 |
| JP | 2000-158478 | 6/2000 |

(Continued)

OTHER PUBLICATIONS

International Search Report of PCT application No. PCT/JP2020/012309 dated Jun. 16, 2020.

(Continued)

*Primary Examiner* — Nicole M. Buie-Hatcher
*Assistant Examiner* — Taylor Harrison Krone
(74) *Attorney, Agent, or Firm* — WHDA, LLP

(57) ABSTRACT
A battery pack includes a plurality of batteries each including a discharge valve that opens when an internal pressure becomes higher than a set pressure, and case housing batteries. Case has an integrated structure of plastic resin case and metal plate, resin case has heat radiation opening closed by metal plate, and metal plate has a plurality of smoke discharge holes in closed region where heat radiation opening of resin case is closed.

17 Claims, 7 Drawing Sheets

(51) Int. Cl.

| | |
|---|---|
| *H01M 50/231* | (2021.01) |
| *H01M 50/276* | (2021.01) |
| *H01M 50/278* | (2021.01) |
| *H01M 50/28* | (2021.01) |
| *H01M 50/298* | (2021.01) |
| *H01M 50/30* | (2021.01) |

(52) U.S. Cl.
    CPC ....... *H01M 50/276* (2021.01); *H01M 50/278* (2021.01); *H01M 50/28* (2021.01); *H01M 50/298* (2021.01); *H01M 50/394* (2021.01)

(58) Field of Classification Search
    CPC ... H01M 50/298; H01M 50/28; H01M 50/213
    See application file for complete search history.

(56) References Cited

U.S. PATENT DOCUMENTS

| | | | | |
|---|---|---|---|---|
| 2007/0236177 | A1* | 10/2007 | Phillips | H01M 50/227 |
| | | | | 429/82 |
| 2012/0301765 | A1* | 11/2012 | Loo | H01M 50/224 |
| | | | | 429/100 |
| 2015/0270590 | A1* | 9/2015 | Okutani | H01M 50/24 |
| | | | | 429/82 |
| 2016/0204404 | A1* | 7/2016 | Shimizu | H01M 50/342 |
| | | | | 429/82 |
| 2017/0187016 | A1* | 6/2017 | Nagasato | H01M 50/545 |
| 2018/0269448 | A1 | 9/2018 | Shimizu et al. | |
| 2019/0372182 | A1* | 12/2019 | Takayasu | B60L 50/64 |
| 2020/0365848 | A1* | 11/2020 | Dinkelman | H01M 50/227 |

FOREIGN PATENT DOCUMENTS

| | | | | | |
|---|---|---|---|---|---|
| JP | 2003323869 | A | * | 11/2003 | Y02E 60/10 |
| JP | 2004-006116 | A | | 1/2004 | |
| JP | 2006-185756 | | | 7/2006 | |
| WO | 2000/030828 | | | 6/2000 | |
| WO | 2015/064096 | | | 5/2015 | |

OTHER PUBLICATIONS

English Translation of Chinese Office Action dated Nov. 25, 2022, issued in counterpart CN application No. 202080024450.8. (4 pages).

* cited by examiner

FIG. 1

BATTERY PACK

CROSS-REFERENCE TO RELATED APPLICATIONS

This application is a U.S. national stage application of the PCT International Application No. PCT/JP2020/012309 filed on Mar. 19, 2020, which claims the benefit of foreign priority of Japanese patent application No. 2019-060103 filed on Mar. 27, 2019, the contents all of which are incorporated herein by reference.

TECHNICAL FIELD

The present invention relates to a battery pack in which batteries each having a discharge valve are housed in a case, and particularly to a battery pack optimum for a structure in which a portion of the case is made of metal.

BACKGROUND ART

Battery packs that achieve high flame retardant property by providing a metal plate to a portion of a case have been developed. (See PTL 1)

In this battery pack, the case is composed of an upper case and a lower case, and a main portion of the upper case and a main portion of the lower case are formed of a metal plate, and a peripheral wall of the upper case and a peripheral wall of the lower case are joined to each other as resin cases.

CITATION LIST

Patent Literature

PTL 1: Unexamined Japanese Patent Publication No. 2006-185756

SUMMARY OF THE INVENTION

In a conventional battery pack in which a main portion of a case is formed of a metal plate, the case can be made robust while having flame retardant property. However, as in a case of a lithium ion secondary battery, in a battery pack where batteries each having a discharge valve are disposed in the case, it is important to safely discharge a blown-off gas from the discharge valve when opened. In a battery pack formed of a robust case where a main portion is formed of a metal plate, safety of the battery pack cannot be guaranteed in a state where a blown-off gas having a high temperature and a high pressure is blown off. This is because when the case is broken because of a blown-off gas having a high temperature and a high pressure, a gas having a high temperature which is generated by evaporation of an electrolytic solution is blown off to the outside at a time, and adverse effects such as firing of a blown-off gas having a high temperature outside the case occur.

The present invention has been developed for the purpose of further preventing the occurrence of the above-mentioned adverse effects, and it is an object of the present invention to provide a battery pack that can be safely used while suppressing discharging of a flame to the outside of the case caused by a blown-off gas having a high temperature and a high pressure while allowing the case to have a robust structure.

A battery pack according to an aspect of the present invention includes a plurality of batteries 1 each including a discharge valve that opens when an internal pressure becomes higher than a set pressure, and case 2 configured to house batteries 1. Case 2 has an integrated structure formed of resin case 3 made of plastic and metal plate 4, resin case 3 has heat radiation opening 5 closed by metal plate 4, and metal plate 4 has a plurality of smoke discharge holes 7 in closed region 6 where heat radiation opening 5 of resin case 3 is closed.

The battery pack described above has a feature that the case can have a robust structure and can be safely used by suppressing blowing-off of a flame to the outside of the case caused by a blown-off gas having a high temperature and a high pressure.

BRIEF DESCRIPTION OF DRAWINGS

FIG. 1 is a perspective view of a battery pack according to an exemplary embodiment of the present invention.

DESCRIPTION OF EMBODIMENT

Figure 2:
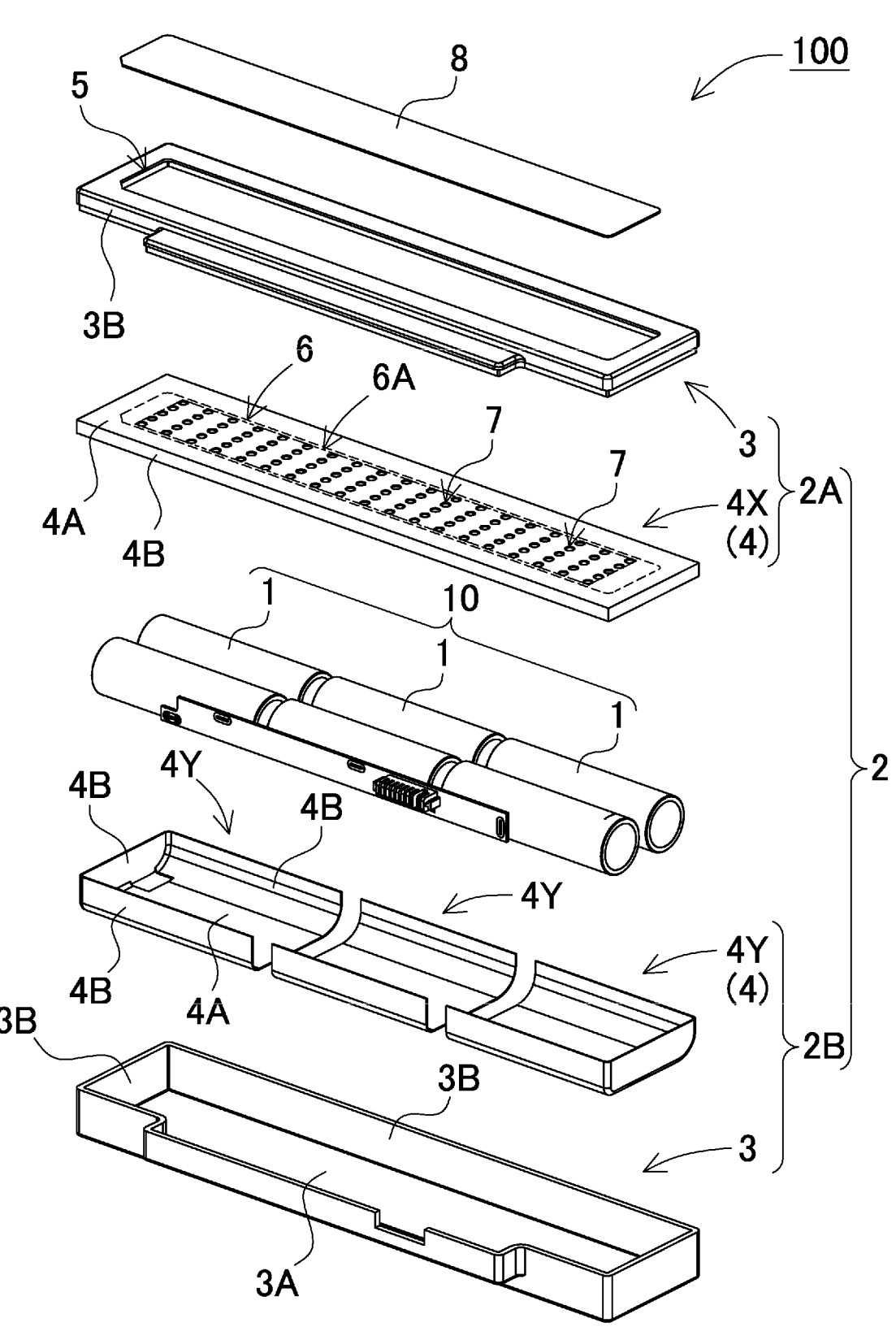
FIG. 2 is an exploded perspective view of the battery pack illustrated in FIG. 1.

Hereinafter, the present invention will be described in detail with reference to the drawings. In the following description, terms indicating specific directions and positions (for example, "upper", "lower", and other terms that include those terms) are used when necessary. However, these terms are used to facilitate understanding of the invention with reference to the drawings, and the technical scope of the present invention is not limited by the meanings of these terms. Portions denoted by the same reference numerals in a plurality of drawings indicate the identical or equivalent portions or members.

Further, the following exemplary embodiment illustrates specific examples of the technical concept of the present invention, and does not limit the present invention to the following exemplary embodiment. In addition, unless otherwise specified, dimensions, materials, shapes, relative arrangements, and the like of the components described below are not intended to limit the scope of the present invention, but are intended to be illustrative. The contents described in one exemplary embodiment or one example are also applicable to other exemplary embodiments and examples. In addition, there may cases where sizes, positional relationships, and the like of members illustrated in the drawings are exaggerated for the sake of clarity of description.

A battery pack according to a first aspect of the present invention includes: a plurality of batteries each including a discharge valve that opens when an internal pressure becomes higher than a set pressure; and a case configured to house the batteries, wherein the case has an integrated structure formed of a resin case made of plastic and a metal plate, the resin case has a heat radiation opening that is closed by the metal plate, and the metal plate has a plurality of smoke discharge holes in a closed region where the heat radiation opening of the resin case is closed.

In the battery pack described above, the case has a robust structure as an integrated structure of the resin case and the metal plate, and a blown-off gas having a high temperature and a high pressure blown off from the discharge valve of the battery is made to pass through the smoke discharge holes disposed in the closed region where the metal plate closes the heat radiation opening of the resin case and is discharged to the outside. The closed region of the metal plate absorbs the thermal energy of the passing blown-off gas, lowers the temperature of the blown-off gas, and discharges the temperature-lowered gas to the outside of the case. This battery pack cools the blown-off gas blown off from the battery in the closed region of the metal plate and discharges the blown-off gas to the outside of the case. Accordingly, it is possible to suppress the blown-off gas from being blown off as a flame outside the case. In the closed region of the metal plate where the heat radiation opening of the resin case is closed and both surfaces of the metal plate are exposed to both surfaces of the resin case, the inner surface is brought into a state favorable for thermal conduction with the inside of the case, and the outer surface is brought into a state favorable for thermal conduction with the outside of the resin case. The closed region of the metal plate disposed in this state efficiently absorbs the thermal energy of the blown-off gas when the battery thermally runs away in the case so that a high-temperature gas blows off and the internal temperature rises. Further, the closed region of the metal plate efficiently radiates the absorbed thermal energy to the outer surface of the resin case. Particularly, the high-temperature blown-off gas injected into the case flows along the inner surface of the closed region of the metal plate, and further flows through the smoke discharge holes at a high speed. Accordingly, thermal energy can be efficiently conducted to the metal plate. The metal plate absorbs the energy of the blown-off gas so that the temperature of the metal plate rises. The metal plate whose temperature rises efficiently radiates the absorbed thermal energy from the surface of the closed region.

Further, in the battery pack described above, the metal plate and the resin case are connected to each other so as to form an integrated structure so that the heat radiation opening of the resin case is closed by the metal plate having the smoke discharge holes. The metal plate that closes the heat radiation opening of the resin case has extremely excellent thermal conductivity characteristics compared with the plastic which is a material of the resin case. Incidentally, the thermal conductivity of polycarbonate, which is plastic optimal for the resin case, is about 0.2 W/(m·K), and the thermal conductivity of aluminum optimal for the metal plate is about 200 W/(m·K), which is 1000 times higher than the thermal conductivity of polycarbonate. Therefore, with the provision of the structure where the heat radiation opening of the resin case is closed by the metal plate having the smoke discharge hole, and the high-temperature blown-off gas is discharged from the smoke discharge hole in the closed region of the metal plate, the thermal energy of the blown-off gas is extremely efficiently absorbed and discharged by the metal plate having extremely excellent thermal conductivity characteristics. Therefore, it is possible to efficiently suppress a blown-off gas having a high temperature and a high pressure blown off into the case from being discharged to the outside of the case and generating a flame thus enhancing safety of the battery pack. Furthermore, since the battery pack described above exhausts the high-temperature blown-off gas to the outside from the smoke discharge holes disposed in the closed region of the metal plate, the smoke discharge holes and the vicinity of the smoke discharge holes are not damaged by the thermal energy of the blown-off gas, and a feature that the blown-off gas can be safely discharged to the outside while preventing flame is also realized.

In a battery pack according to a second aspect of the present invention, the metal plate is brought into close contact with the resin case by outsert molding in the integrated structure.

The battery pack described above has a feature that the metal plate and the resin case can be connected to each other in an integrated structure without a gap, and the metal plate and the resin case can be brought into close contact with each other, so that the case can be made thin and can have a large strength.

In a battery pack according to a third aspect of the present invention, the case includes a first case and a second case, in the first case and the second case, the resin case made of a thermoplastic resin is formed on an outer peripheral portion of the metal plate, and the resin case of the first case and the resin case of the second case are connected to each other.

In the battery pack described above, the resin case is formed on the outer peripheral portion of the metal plate, and the resin cases are connected to form a closed structure. Therefore, the connecting portion between the first case and the second case can be manufactured by molding plastic into a shape optimum for connection. Therefore, there is a feature that the first case and the second case can be connected simply and easily with certainty.

In a battery pack according to a fourth aspect of the present invention, the resin case has a resin peripheral wall disposed along an outer peripheral edge of the metal plate, and the resin peripheral wall of the first case and the resin peripheral wall of the second case are thermally bonded to each other so that an inside of the resin cases define a closed structure.

In the battery pack described above, since the resin peripheral wall is thermally bonded to connect the first case and the second case to the closed structure, the resin peripheral wall can be connected in a state where leaking of a gas does not occur. Therefore, leakage of the blown-off gas blown off into the case from the peripheral wall connecting portion can be suppressed, and the blown-off gas can be collected and discharged to the smoke discharge holes formed in the metal plate. Since the blown-off gas is collectively discharged to the smoke discharge holes formed in the metal plate, the thermal energy of the blown-off gas can be efficiently radiated to the metal plate, and the blown-off gas can be safely discharged to the outside of the case so as not to generate a flame.

In a battery pack according to a fifth aspect of the present invention, the resin case is configured such that a heat generating wire that melts and thermally bonds thermoplastic resins is embedded in a connecting portion of the resin peripheral wall, and the resin peripheral walls are thermally welded to each other by heat generated by the heat generating wire.

In the battery pack described above, since the resin peripheral wall can be thermally melted and connected by the heat generating wire, the first case and the second case can be connected with certainty while preventing gas leakage from the connecting portion. Further, there is a feature that the resin peripheral walls of the first case and the second case are firmly connected to each other with certainty, so that it is possible to effectively prevent the connecting portion of the case from being damaged by a blown-off gas having a high temperature and a high pressure and to ensure high safety by concentrating and discharging the blown-off gas in the smoke discharge holes formed in the metal plate.

In a battery pack according to a sixth aspect of the present invention, the metal plate is a press plate made of metal where a metal peripheral wall is disposed on an outer periphery of a surface plate portion, and the metal peripheral wall is embedded in the resin peripheral wall.

In the battery pack described above, since the metal plate is the metal press plate provided with the surface plate portion and the metal peripheral wall, and the metal peripheral wall is stacked on the resin peripheral wall. Accordingly, the entire case can have an extremely robust structure. Therefore, this battery pack has a feature that the case is not damaged by a blown-off gas having a high temperature and a high pressure blown off into the battery pack, and the case can be prevented from being damaged by an impact such as falling.

In a battery pack according to a seventh aspect of the present invention, the metal peripheral wall of the first case and the metal peripheral wall of the second case are stacked to each other at the connecting portion of the resin peripheral walls.

The battery pack described above has a feature that, since the metal peripheral walls of the first case and the second case are stacked at the connecting portion of the resin peripheral wall, the connecting portion of the peripheral wall can be made extremely strong, and damage of the connecting portion caused by a blown-off gas, breaking of the case caused by an impact due to falling, can be prevented with more certainty.

In a battery pack according to an eighth aspect of the present invention, the first case has a closed region that closes a heat radiation opening of the resin case, and the second case is stacked on an inner surface of a bottom plate portion of the resin case in a state where the metal plate is exposed.

The battery pack described above has a feature that the metal plate exposed on the inner surface of the bottom plate portion of the second case can efficiently absorb internal thermal energy and radiate heat.

In a battery pack according to a ninth aspect of the present invention, the second case is formed by fixing a plurality of metal plates formed by dividing in an insulating state from each other to an inner surface of the resin case, and the metal plates formed by dividing in an insulating state are disposed at positions that face the battery having a potential difference.

The battery pack described above has a feature that the metal plate of the second case is divided into a plurality of metal plates, the divided metal plates are arranged in an insulated manner, and the batteries having a potential difference are arranged facing the divided metal plates, so that the batteries having a potential difference can be efficiently cooled by the metal plates arranged facing each other, and a short circuit of the battery having a potential difference due to the metal plate can be prevented.

In a battery pack according to a tenth aspect of the present invention, in the metal plate of the first case, 50% or more of the entire closed region is set as a gas discharge region, and a plurality of smoke discharge holes are formed in the gas discharge region, an opening area of the smoke discharge hole is 5 mm$^2$ or less, and a total opening area obtained by adding opening areas of all smoke discharge holes is set to 10% or more of the entire gas discharge region.

The battery pack described above has a feature that the plurality of smoke discharge holes each having an opening area of 5 mm$^2$ or less are formed in the gas discharge region so that the total opening area is 10% or more of the entire gas discharge region with 50% or more of the entire closed region as the gas discharge region, so that a large number of small smoke discharge holes are formed in the wide closed region and hence, the thermal energy of the blown-off gas is efficiently absorbed by the metal plate, and the blown-off gas can be discharged to the outside while the energy of the blown-off gas is attenuated in the smoke discharge holes having a smaller opening area. This is because the energy is attenuated by the pressure loss of the blown-off gas passing through the small smoke discharge holes.

In a battery pack according to an eleventh aspect of the present invention, a total opening area of the plurality of smoke discharge holes is 5% or more of an area of the closed region.

The battery pack described above has a feature that, since the total opening area of the plurality of smoke discharge holes is set to 5% or more of the area of the closed region, the blown-off gas can be discharged to the outside from the large number of smoke discharge holes, and the blown-off gas can be discharged while reducing the energy of the blown-off gas.

In a battery pack according to a twelfth aspect of the present invention, the first case is configured such that a plurality of batteries are arranged in a plurality of rows, and a smoke discharge gap is formed between the batteries and a metal plate inside the closed region of the metal plate.

In the battery pack described above, since the plurality of batteries are arranged in a plurality of rows on the inner surface of the closed region of the metal plate through the smoke discharge gap, the thermal energy of each battery can be efficiently absorbed by the metal plate while insulating the battery and the metal plate from each other.

In a battery pack according to a thirteenth aspect of the present invention, the battery is a cylindrical battery, a plurality of cylindrical batteries are linearly arranged to form a linear battery unit, and the linear battery unit is disposed so as to face the closed region of the metal plate.

The battery pack described above has a feature that the plurality of cylindrical batteries are arranged in the case, and each cylindrical battery can be efficiently cooled by a metal plate.

In a battery pack according to a fourteenth aspect of the present invention, the batteries forming the battery unit are connected in series, the metal plate of the second case is divided, and a boundary portion of the divided metal plates is disposed at a position facing a connecting portion of batteries that are linearly connected.

The battery pack described above has a feature that the connecting portions of the batteries linearly connected to each other are disposed at the positions facing the boundary portions of the divided metal plates, so that, while the cylindrical batteries linearly arranged are cooled with high efficiency by the divided metal plates, a short circuit of the batteries due to the metal plates can be prevented in a state where there is a potential difference between the batteries linearly connected to each other.

In a battery pack according to a fifteenth aspect of the present invention, a label of an insulating sheet having flexibility is attached to a surface of the closed region.

The battery pack described above has a feature that, since the smoke discharge holes in the closed region where the metal plate is exposed from the resin case are closed by the label, it is possible to prevent foreign matter from entering from the smoke discharge hole or to prevent a user from inserting the foreign matter so that the user can use the battery pack safely. In addition, the surface of the metal plate can be insulated by the label so that the battery pack can be used more safely. Furthermore, since the label made of the flexible insulating sheet closes the smoke discharge holes, the pressure in the case increases. Furthermore, since the label is heated by the blown-off gas in this state, the label is peeled off from the metal plate so as to open the smoke discharge holes, and the blown-off gas is discharged to the outside.

In a battery pack according to a sixteenth aspect of the present invention, the label has: an attachment region that is attached to a surface of the closed region; and a non-attachment region that is not attached to the surface of the closed region, and the non-attachment region is disposed in communication with the smoke discharge hole.

The battery pack described above has a feature that the effect of absorbing the thermal energy of the blown-off gas by the metal plate can be further enhanced during a period until the label is peeled off by the blown-off gas. This is because the blown-off gas blown off from the battery flows to the surface of the metal plate through the smoke discharge holes, and further, the blown-off gas flowing to the surface of the metal plate flows at a high speed in the non-attachment region between the metal plate and the label to efficiently conduct thermal energy to the metal plate. In particular, the label of the flexible insulating sheet expands the non-attachment region with the high-temperature blown-off gas flowing at a high speed to increase the flow rate of the blown-off gas and enhance the heat radiation effect to the metal plate, thereby lowering the temperature of the blown-off gas.

In a battery pack according to a seventeenth aspect of the present invention, in the non-attachment region of the label, the adjacent smoke discharge holes communicate with each other.

In the battery pack described above, since the non-attachment region communicates with the adjacent smoke discharge holes, the path is elongated, and the blown-off gas flows at a high speed in the non-attachment region of the elongated path to more efficiently cool the blown-off gas. The blown-off gas flowing through the non-attachment region of the label is discharged from the smoke discharge holes to the outside of the case in a state where the pressure in the case increases and the label is peeled off.

Further, in a battery pack according to an eighteenth aspect of the present invention, the battery is a non-aqueous electrolyte secondary battery.

First Exemplary Embodiment

Figure 1:
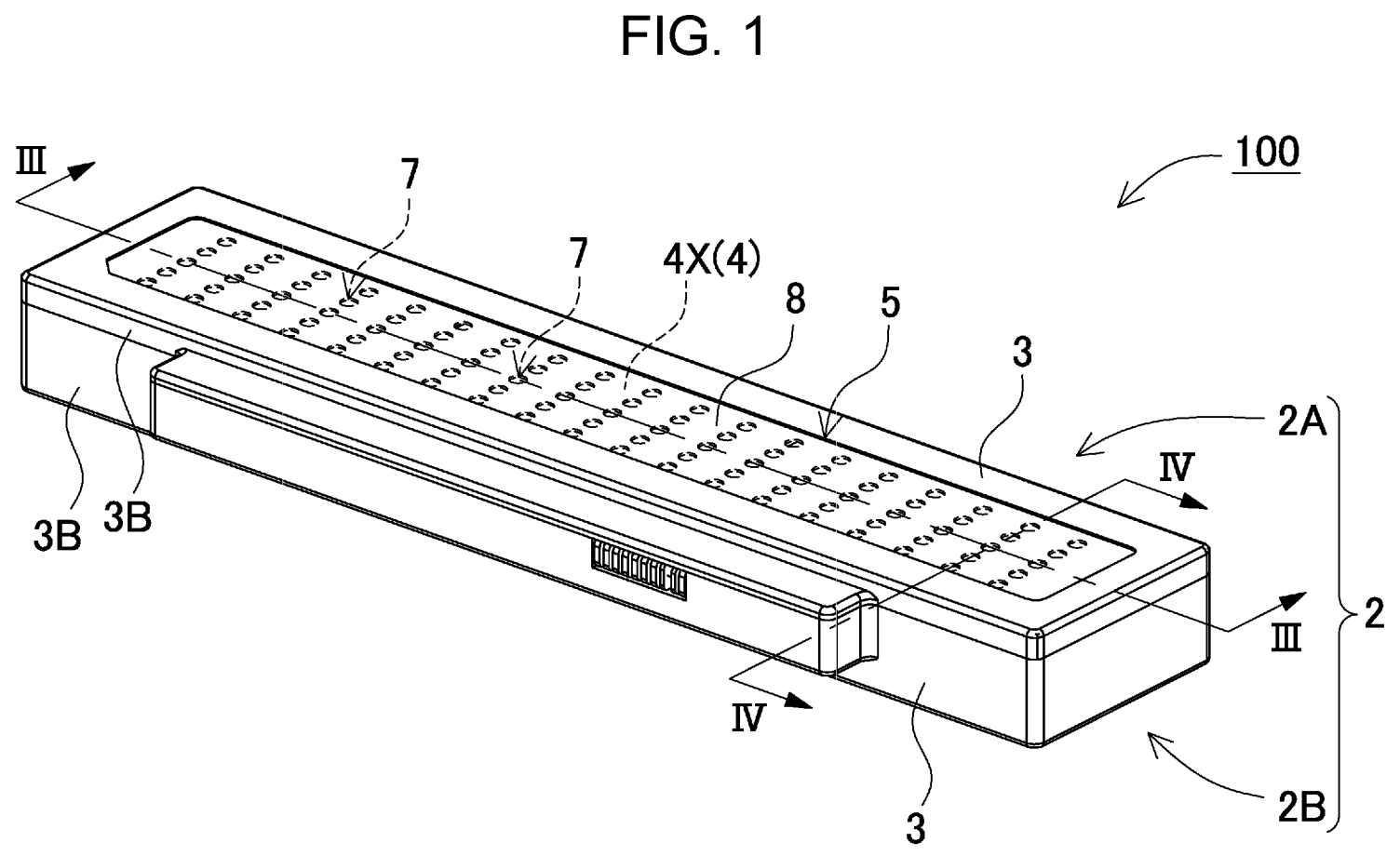

A battery pack illustrated in FIG. 1 that is a perspective view and FIG. 2 that is an exploded perspective view includes: a plurality of batteries 1 each including a discharge valve that opens when an internal pressure becomes higher than a set pressure; and case 2 housing batteries 1. Case 2 is an integrated structure formed of resin case 3 made of plastic and metal plate 4. Resin case 3 has heat radiation opening 5 closed by metal plate 4. A plurality of smoke discharge holes 7 are formed in closed region 6 of metal plate 4 that closes heat radiation opening 5 of resin case 3. The metal plate 4 is connected to resin case 3 to form the integrated structure by outsert molding in a state where metal plate 4 is brought into close contact with resin case 3.

Case 2 is formed of first case 2A and second case 2B. In first case 2A and second case 2B, resin case 3 made of a thermoplastic resin is formed on an outer peripheral portion of metal plate 4, and resin case 3 of first case 2A and resin case 3 of second case 2B are connected to each other. Resin case 3 has resin peripheral wall 3B disposed along the outer peripheral edge of metal plate 4, and first case 2A and second case 2B form the inside thereof into a closed structure by thermally bonding resin peripheral walls 3B.

In first case 2A and second case 2B, resin peripheral walls 3B of resin cases 3 are thermally bonded to each other. Opening end surfaces of resin peripheral walls 3B are connected to each other by thermal melting. Resin cases 3 are made of a thermoplastic resin such as polycarbonate. However, a material of resin cases 3 is not limited to polycarbonate, and for example, a thermoplastic resin such as polyamide, polyvinylidene chloride, or polypropylene can be used.

Figure 3:
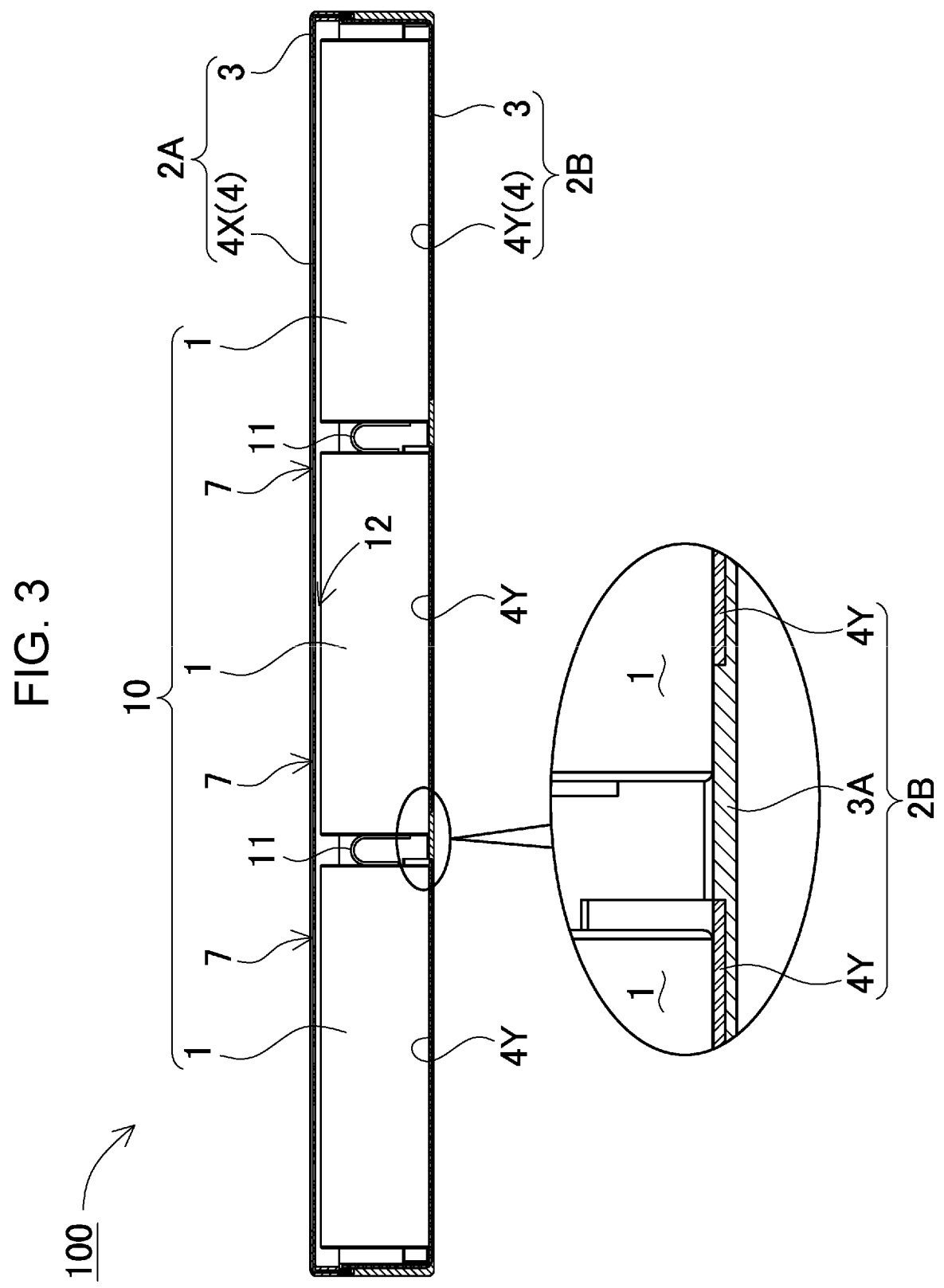
FIG. 3 is a partially enlarged cross-sectional view taken along line III-III of the battery pack illustrated in FIG. 1.
Figure 4:
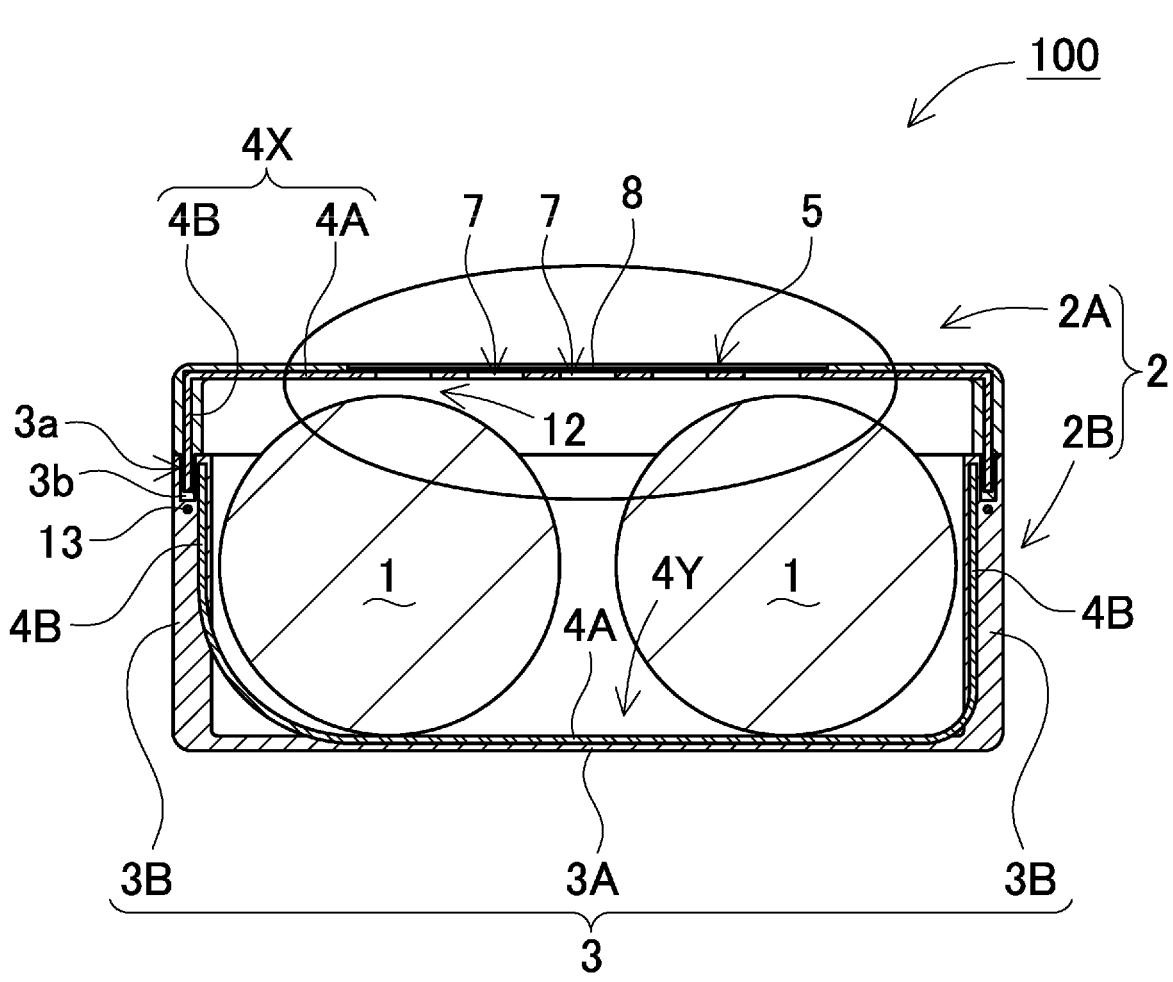
FIG. 4 is a partially enlarged cross-sectional view taken along line IV-IV of the battery pack illustrated in FIG. 1.
Figure 5:
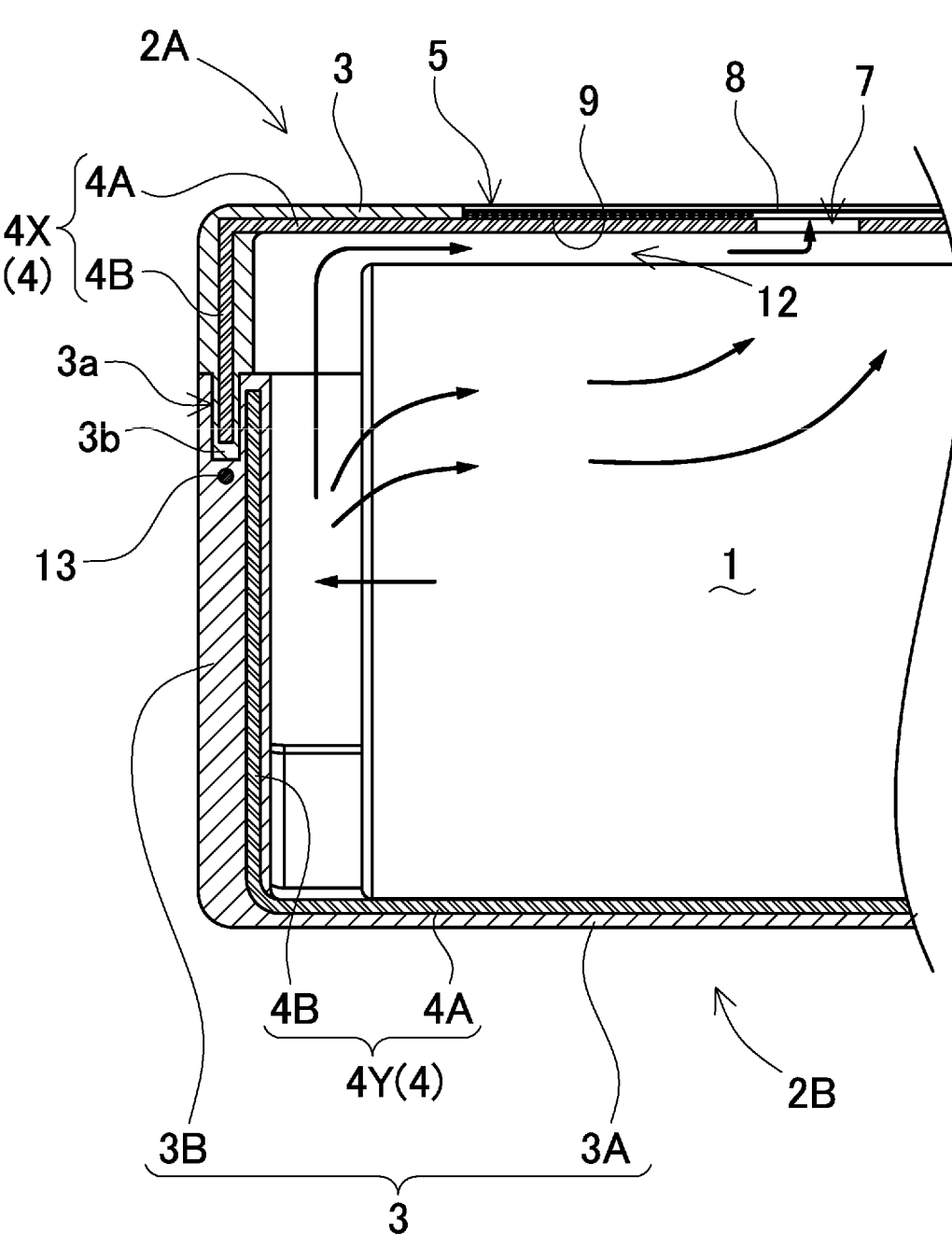
FIG. 5 is an enlarged cross-sectional view of the battery pack illustrated in FIG. 3.

In resin case 3, heat generating wire 13 is embedded in one opening area along resin peripheral wall 3B. Heat generating wire 13 generates heat by being supplied with electricity in a state where opening end surfaces of first case 2A and second case 2B are brought into close contact with each other, and thermally melts and welds resin peripheral walls 3B. Cross-sectional views in FIGS. 3 to 5 illustrate a connecting portion of resin peripheral walls 3B that are thermally welded to each other. In the connecting portion illustrated in these drawings, fitting groove 3a is formed on one resin peripheral wall 3B in a longitudinal direction, fitting protrusion 3b that is guided to fitting groove 3a is formed on the other resin peripheral wall 3B, and heat generating wire 13 is disposed at a bottom portion of fitting groove 3a. With respect to resin peripheral wall 3B, electricity is supplied to heat generating wire 13 in a state where fitting protrusion 3b is inserted into fitting groove 3a and fitting protrusion 3b and fitting groove 3a are brought into close contact with each other. Accordingly, heat generating wire 13 thermally melts the resin in the vicinity of heat generating wire 13 so as to thermally weld the pair of resin peripheral walls 3B.

Aluminum (including an aluminum alloy) is suitable as a material of metal plate 4. Since aluminum is light in weight and is excellent in thermal conductivity characteristics, it is possible to reduce a weight of battery 1 and to increase heat radiation efficiency of battery 1. However, as metal plate 4, a metal other than aluminum, for example, copper, nickel, zinc, iron, or an alloy thereof can also be used. A thickness of metal plate 4 can be increased so as to increase thermal energy to be absorbed by metal plate 4. However, thick metal plate 4 is heavy. Accordingly, the thickness of metal plate 4 is set to an optimum thickness in consideration of the application of battery 1. For example, by setting the thickness of metal plate 4 to 0.2 mm to 1 mm, battery 1 can realize required heat radiation characteristics while reducing the weight.

Metal plate 4 is a metal molded plate having a shape where metal peripheral wall 4B is disposed along an outer periphery of planar surface plate portion 4A. Metal peripheral wall 4B is connected to resin case 3 in a state where metal peripheral wall 4B is embedded in resin peripheral wall 3B. In first case 2A and second case 2B, metal peripheral wall 4B is embedded in resin peripheral wall 3B in a state where resin peripheral wall 3B is stacked on both surfaces of metal peripheral wall 4B. An end edge portion of metal peripheral wall 4B is in a wrapped state in a state where resin peripheral walls 3B of first case 2A and second case 2B are connected to each other. Case 2 in which metal peripheral wall 4B is embedded in connecting portion of resin peripheral wall 3B in a wrapped state can impart a sufficient strength to the connecting portion of resin peripheral wall 3B. Furthermore, since metal peripheral walls 4B of first case 2A and second case 2B approach each other in the wrapped portion, heat is conducted from metal peripheral wall 4B of first case 2A to metal peripheral wall 4B of second case 2B. Accordingly, heat radiation efficiency of metal plate 4 of first case 2A can be increased.

In first case 2A, heat radiation opening 5 of resin case 3 is closed by metal plate 4X. In metal plate 4X, the plurality of smoke discharge holes 7 are formed in closed region 6 that closes heat radiation opening 5 of resin case 3. In closed region 6 of metal plate 4X, a region where smoke discharge holes 7 are formed is set as gas discharge region 6A, and smoke discharge holes 7 are formed in gas discharge region 6A. In closed region 6, a blown-off gas can be more efficiently cooled by increasing an area of gas discharge region 6A in which smoke discharge holes 7 are formed. A large number of smoke discharge holes 7 are formed in gas discharge region 6A. In metal plate 4X, for example, 50% or more of entire closed region 6 is set as gas discharge region 6A, and a large number of smoke discharge holes 7 are formed in gas discharge region 6A. Although smoke discharge hole 7 in the drawings has a circular shape, smoke discharge hole 7 is not necessarily limited to a circular shape, and can have various shapes such as an elliptical shape, a polygonal shape, and a slit. For example, an opening area of smoke discharge hole 7 is set to 5 mm$^2$ or less, and a total opening area obtained by adding opening areas of all smoke discharge holes 7 is set to 10% or more of entire gas discharge region 6A. More preferably, the opening area of smoke discharge hole 7 is set to 4 mm$^2$ or less, gas discharge region 6A is set to 60% or more of entire closed region 6, and the total opening area of smoke discharge holes 7 is set to 15% or more of entire gas discharge region 6A. Since small smoke discharge hole 7 increases a pressure loss of a blown-off gas passing through smoke discharge hole 7, the structure is adopted where the number of smoke discharge holes 7 is increased so that a blown-off gas can quickly pass through smoke discharge holes 7.

In second case 2B, metal plate 4Y is stacked on an inner surface of bottom plate portion 3A of resin case 3 in a state where metal plate 4Y is exposed. In the second case illustrated in FIGS. 3 to 5, metal plate 4Y is fixed to resin case 3 by outsert-molding in a state where metal plate 4Y is exposed to the inside of resin case 3. Metal plate 4Y exposed on an inner surface of second case 2B adopts the structure where metal pate 4Y efficiently absorbs thermal energy of battery 1 by coming into contact with battery 1 whose surface is insulated. Battery 1 is insulated by covering a surface of battery 1 with a heat-shrinkable tube or like, or by forming an insulating film on the surface of battery 1. Metal plate 4Y of second case 2B is divided into a plurality of metal plates 4Y. These metal plates 4Y are insulated from each other, and are fixed to an inner surface of resin case 3. Divided metal plates 4Y are arranged so as to face batteries 1 having a potential difference. This structure enables efficient cooling by bringing metal plates 4Y into contact with batteries 1 having a potential difference. Divided metal plates 4Y are arranged in an insulating manner from each other, and are brought into contact with batteries 1 having a potential difference. Although respective metal plates 4Y are brought into contact with batteries 1 having a potential difference, metal plates 4Y are arranged in a divided manner in an insulated state from each other and hence, metal plates 4Y do not cause short-circuiting between batteries 1. Further, metal plates 4Y do not cause short-circuiting by being brought into contact with a conductive part arranged between batteries 1, for example, a lead plate 11 of a metal plate which electrically connects batteries 1 to each other.

Battery 1 of battery pack 100 illustrated in FIG. 2 is a cylindrical battery. Further, battery 1 is a non-aqueous electrolyte secondary battery such as a lithium ion secondary battery. This battery pack 100 can be made light-weighted, and can increase charging and discharging of capacity. However, the battery pack does not limit a battery to a non-aqueous electrolyte secondary battery such as a lithium ion secondary battery, and other batteries that blow off a blown-off gas from the discharge valve when the valve is opened can also be used.

In battery pack 100 illustrated in this drawing, three cylindrical batteries 1 are linearly arranged to form linear battery unit 10. Batteries 1 linearly arranged are connected in series via lead plates 11. Battery units 10 are arranged side by side in two rows in a parallel posture. In battery pack 100 where three batteries 1 are linearly arranged, metal plate 4Y is divided into three metal plates 4Y, and each metal plate 4Y is brought into contact with battery 1 so as to radiate heat. Metal plate 4Y of second case 2B bends a boundary portion of metal plate 4Y with metal peripheral wall 4B on both sides of surface plate portion 4A in a curved shape which follows a surface of battery 1. With such a configuration, a contact area of metal plate 4Y with battery 1 can be broadened and hence, heat can be efficiently radiated from battery 1.

First case 2A is disposed so as to face closed region 6 of metal plate 4X, battery units 10 are arranged in two rows, and a blown-off gas from each battery 1 is discharged to the outside from smoke discharge holes 7. In first case 2A illustrated in FIGS. 3 to 5, the plurality of batteries 1 are arranged in a plurality of rows inside closed region 6 of metal plate 4X, and smoke discharge gap 12 is formed between battery 1 and metal plate 4X. In first case 2A illustrated in the drawing, a gap is formed between battery 1 and metal plate 4X, and this gap defines smoke discharge gap 12. In this battery pack, smoke discharge gap 12 formed between battery 1 and metal plate 4X forms a smoke discharge duct that insulates battery 1 and metal plate 4X from each other and allows a blown-off gas discharged from the discharge valve of battery 1 to pass through smoke discharge gap 12 toward smoke discharge holes 7 formed in metal plate 4X. Arrows in FIGS. 5 and 6 indicate a path through which a blown-off gas discharged from battery 1 is discharged from smoke discharge holes 7 when the discharge valve disposed on a sealing plate of battery 1 is opened.

Figure 6:
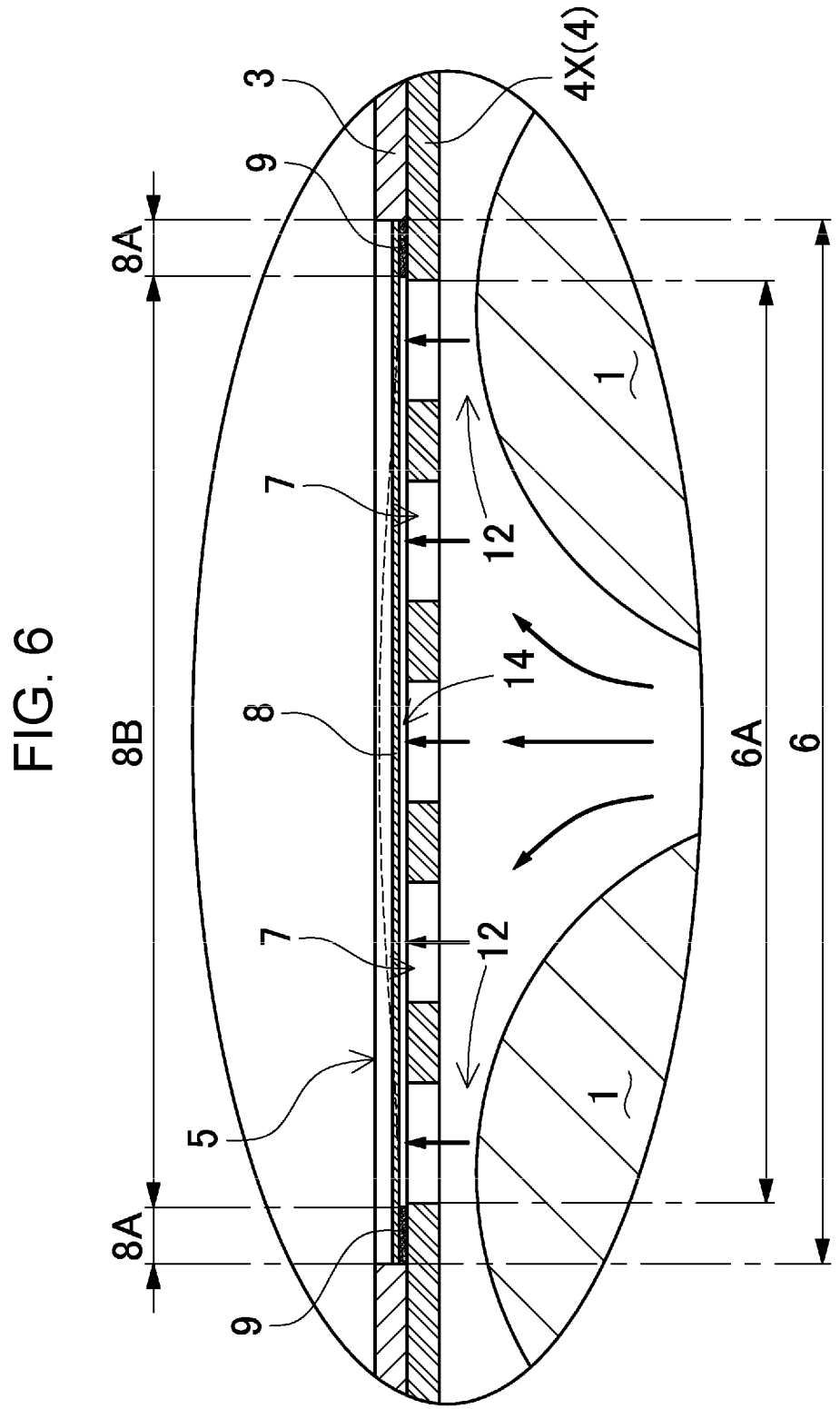
FIG. 6 is an enlarged cross-sectional view of the battery pack illustrated in FIG. 4.
Figure 7:
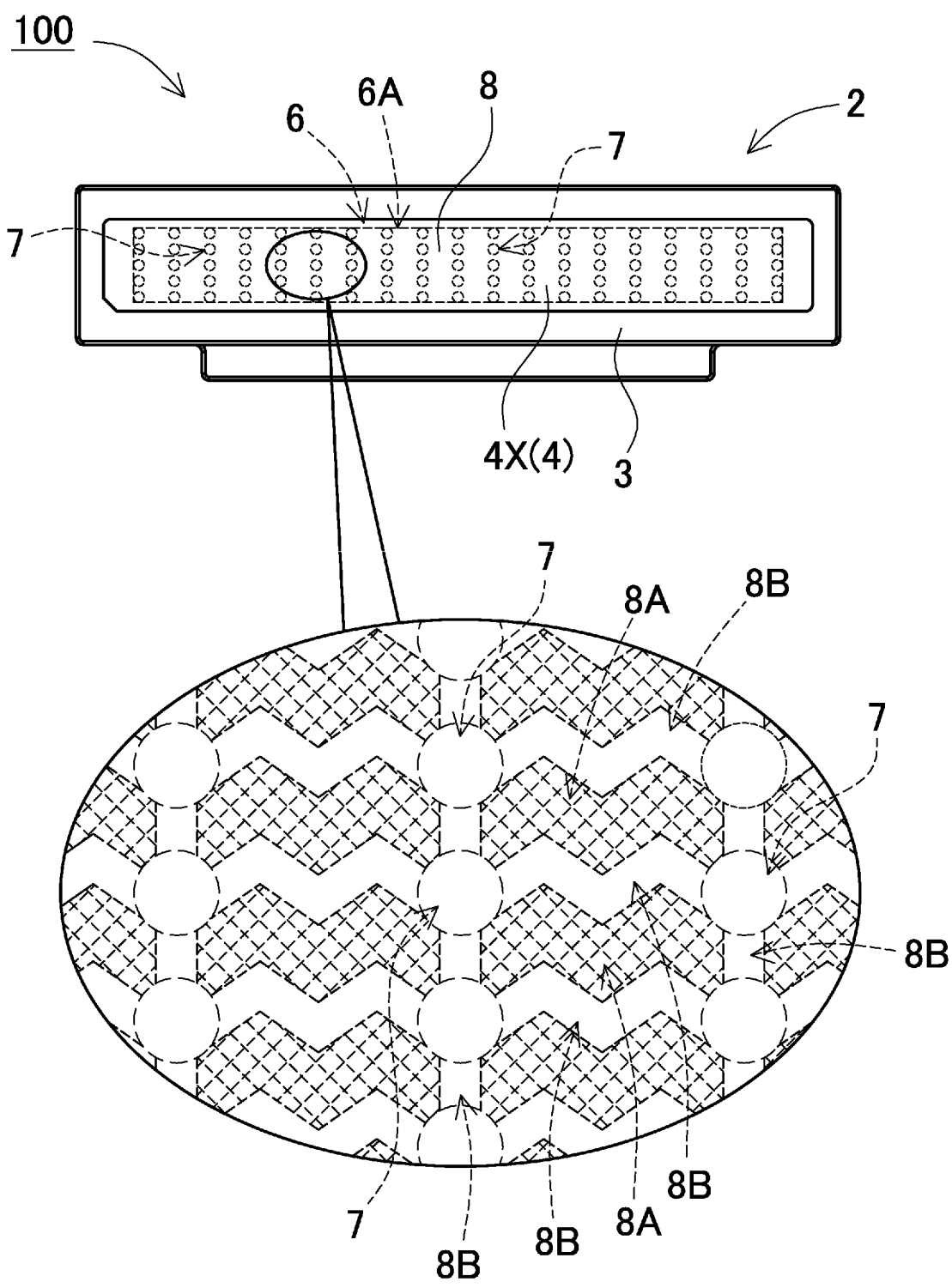
FIG. 7 is an enlarged plan view showing a label portion of the battery pack illustrated in FIG. 1.

In first case 2A, label 8 is attached to a surface of closed region 6 of metal plate 4X. Label 8 can prevent foreign matters from entering from smoke discharge holes 7, and can prevent a user from inserting foreign matters thus enhancing safety. Label 8 is a flexible insulating sheet and is deformed when pressed by a blown-off gas. Label 8 is made to adhere to a surface of metal plate 4X by way of adhesive layer 9. Adhesive layer 9 is preferably a tacky layer. Adhesive layer 9 is heated and is pressed by a blown-off gas so that label 8 is peeled off from the surface of metal plate 4X. A contour of label 8 is equal to a contour of closed region 6 of metal plate 4X. Label 8 is attached to entire surface of closed region 6 to close all smoke discharge holes 7. Label 8 covers the entire surface of closed region 6. However, the entire surface of label 8 is not made to adhere to the surface of closed region 6. As illustrated in FIGS. 6 and 7, label 8 includes attachment region 8A that is attached to closed region 6 by adhesive layer 9 and non-attachment region 8B that is not attached to closed region 6. Non-attachment region 8B is disposed so as to communicate with smoke discharge hole 7, and further communicates with adjacently disposed smoke discharge hole 7 so that non-attachment region 8B communicates with the plurality of smoke discharge holes 7. A blown-off gas that has passed through smoke discharge holes 7 flows into non-attachment region 8B connected to smoke discharge holes 7. A blown-off gas having a high temperature and a high pressure flowing into non-attachment region 8B deforms label 8 so as to expand gap 14 between label 8 and metal plate 4X thus allowing a larger amount of blown-off gas to flow. A blown-off gas flowing in non-attachment region 8B flows at a high speed on a surface of metal plate 4X to radiate thermal energy to metal plate 4X. A blown-off gas that has flowed into elongated non-attachment region 8B and has conducted thermal energy to metal plate 4X increases a pressing force applied to an inner surface of label 8 so as to peel label 8 from metal plate 4X. Elongated non-attachment region 8B can increase the heat radiation efficiency from a blown-off gas to metal plate 4X. As illustrated in FIG. 7, a path of non-attachment region 8B can be substantially elongated by forming the path into a zigzag shape or a wave shape, and the substantial path is lengthened. With such a configuration, the heat radiation efficiency of a blown-off gas can be enhanced.

INDUSTRIAL APPLICABILITY

The present invention can be effectively used for a battery pack that safely discharges a blown-off gas.

REFERENCE MARKS IN THE DRAWINGS

100: battery pack
1: battery
2: case
2A: first case
2B: second case
3: resin case
3A: bottom plate portion
3B: resin peripheral wall
3a: fitting groove
3b: fitting protrusion
4, 4X, 4Y: metal plate
4A: surface plate portion
4B: metal peripheral wall
5: heat radiation opening
6: closed region
6A: gas discharge region
7: smoke discharge hole
8: label
8A: attachment region
8B: non-attachment region
9: adhesive layer
10: battery unit
11: lead plate
12: smoke discharge gap
13: heat generating wire
14: gap
The invention claimed is:
1. A battery pack comprising:
a plurality of batteries each including a discharge valve that opens when an internal pressure becomes higher than a set pressure; and
a case configured to house the batteries, wherein
the case includes an integrated structure formed of a resin case made of plastic and a metal plate, the resin case includes a heat radiation opening that is closed by the metal plate, and
the metal plate includes a plurality of smoke discharge holes in a closed region where the heat radiation opening of the resin case is closed, wherein
the case includes a first case and a second case disposed opposite to each other in an arrangement direction and directly connected to each other to together define a closed structure,
the first case comprises a first resin case and a first metal plate,
the first resin case including a first resin peripheral wall disposed along an outer peripheral edge of the first metal plate and extending in the arrangement direction, and
the first metal plate including a first metal peripheral wall extending from the outer peripheral edge of the first metal plate in the arrangement direction, and having a distal end thereof enclosed within the first resin peripheral wall,
the second case comprises a second resin case and a second metal plate,
the second resin case including a second resin peripheral wall disposed along an outer peripheral edge of the second metal plate and extending in the arrangement direction, and
the second metal plate including a second metal peripheral wall extending from the outer peripheral edge of the second metal plate in the arrangement direction, and having a distal end thereof enclosed within the second resin peripheral wall,
wherein the first resin case defines the heat radiation opening, and the first metal plate has the plurality of smoke discharge holes defined therein,
wherein the first metal peripheral wall and the second metal peripheral wall are stacked to each other at connecting portions of the first and second resin peripheral walls, and
at said connecting portions, the first metal peripheral wall and the second metal peripheral wall overlap each other in an overlap direction perpendicular to the arrangement direction without the first metal peripheral wall and the second metal peripheral wall touching each other, wherein portions of the first resin peripheral wall and the second resin peripheral wall intervene between the first metal peripheral wall and the second metal peripheral wall in the overlap direction.
2. The battery pack according to claim 1, wherein the metal plate is brought into close contact with the resin case by outsert molding in the integrated structure.
3. The battery pack according to claim 1, wherein each of the first resin case and the second resin case is made of a thermoplastic resin, and the first resin case and the second resin case are connected to each other.
4. The battery pack according to claim 3, wherein the first resin peripheral wall and the second resin peripheral wall are thermally bonded to each other so that an inside of the resin cases define a closed structure.
5. The battery pack according to claim 4, wherein the resin case is configured such that a heat generating wire that melts and thermally bonds thermoplastic resins is embedded in a connecting portion of at least one of the first and second resin peripheral walls, and the first resin peripheral wall and the second resin peripheral wall are thermally welded to each other by heat generated by the heat generating wire.

6. The battery pack according to claim 4, wherein at least one of the first metal plate and the second metal plate is a press plate made of metal where a metal peripheral wall is disposed on an outer periphery of a surface plate portion, and the metal peripheral wall is embedded in a corresponding one of the first and second resin peripheral walls.

7. The battery pack according to claim 3, wherein the first case includes the closed region that closes the heat radiation opening of the resin case, and the second case is stacked on an inner surface of a bottom plate portion of the resin case in a state where the second metal plate is exposed.

8. The battery pack according to claim 7, wherein the second case fixing a plurality of metal plates divided in an insulating state from each other to an inner surface of the resin case, and the metal plates divided in an insulating state are disposed at positions that face the batteries including a potential difference.

9. The battery pack according to claim 3, wherein in the first metal plate, 50% or more of all of the closed region is set as a gas discharge region, and a plurality of smoke discharge holes are formed in the gas discharge region, an opening area of the smoke discharge hole is 5 mm$^2$ or less, and a total opening area obtained by adding opening areas of all of the smoke discharge holes is set to 10% or more of all of the gas discharge region.

10. The battery pack according to claim 9, wherein a total opening area of the plurality of smoke discharge holes is 5% or more of an area of the closed region.

11. The battery pack according to claim 3, wherein in the first case, a plurality of batteries is arranged in a plurality of rows inside the closed region of the first metal plate, and a smoke discharge gap is provided between the batteries and the first metal plate.

12. The battery pack according to claim 11, wherein the batteries are a plurality of cylindrical batteries, the plurality of cylindrical batteries are arranged linearly to form a linear battery unit, and the linear battery unit is disposed to face the closed region of the first metal plate.

13. The battery pack according to claim 12, wherein the batteries forming the battery unit are connected in series, the second metal plate is divided into divided metal plates, and a boundary portion of the divided metal plates is disposed at a position facing a connecting portion of batteries that are linearly connected.

14. The battery pack according to claim 1, wherein a label of an insulating sheet including flexibility is attached to a surface of the closed region.

15. The battery pack according to claim 14, wherein the label includes:

an attachment region that is attached to a surface of the closed region; and a non-attachment region that is not attached to the surface of the closed region, and the non-attachment region is disposed in communication with each of the smoke discharge holes.

16. The battery pack according to claim 15, wherein the non-attachment region of the label communicates adjacent smoke discharge holes among the smoke discharge holes.

17. The battery pack according to claim 1, wherein the battery is a non-aqueous electrolyte secondary battery.

* * * * *